United States Patent
Bally et al.

(10) Patent No.: US 12,262,103 B2
(45) Date of Patent: Mar. 25, 2025

(54) VEHICULAR CAMERA WITH ENHANCED EMI SHIELDING

(71) Applicant: Magna Electronics Inc., Auburn Hills, MI (US)

(72) Inventors: Nazar F. Bally, Sterling Heights, MI (US); James L Smith, Washington, MI (US); Jonathan D. Conger, Huntington Woods, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 192 days.

(21) Appl. No.: 18/049,037

(22) Filed: Oct. 24, 2022

(65) Prior Publication Data

US 2023/0128640 A1 Apr. 27, 2023

Related U.S. Application Data

(60) Provisional application No. 63/262,980, filed on Oct. 25, 2021.

(51) Int. Cl.
*H04N 23/51* (2023.01)

(52) U.S. Cl.
CPC .................................. *H04N 23/51* (2023.01)

(58) Field of Classification Search
CPC .............................. H04N 23/51; H05K 9/0088
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,211,457 B1 * | 4/2001 | Cama ................... | H01R 13/658 361/752 |
| 6,433,825 B1 * | 8/2002 | Cama ................... | H05K 5/0295 348/374 |
| 7,901,215 B1 | 3/2011 | Galgoci et al. | |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 8,994,878 B2 | 3/2015 | Byrne et al. | |
| 9,041,806 B2 | 5/2015 | Baur et al. | |
| 9,077,098 B2 | 7/2015 | Latunski | |
| 9,126,525 B2 | 9/2015 | Lynam et al. | |

(Continued)

*Primary Examiner* — Frank Johnson
(74) *Attorney, Agent, or Firm* — HONIGMAN LLP

(57) ABSTRACT

A vehicular camera assembly includes a printed circuit board, a metallic shield element at least partially enclosing the printed circuit board, and a housing at least partially enclosing the shield element. The housing includes a front housing portion accommodating a lens. An imager is disposed at the printed circuit board and is optically aligned with the lens. The camera assembly includes an electrical connector for electrically connecting an electrical connecting element of the printed circuit board to a wire harness of a vehicle. The shield element includes at least one seam, with one or more seams including a respective gap between opposing edge regions of the shield element and an overlapping tab that extends from one of the opposing edge regions that at least partially closes the respective seam. The housing and the shield element are in contact.

21 Claims, 16 Drawing Sheets

(56) References Cited

U.S. PATENT DOCUMENTS

| | | |
|---|---|---|
| 9,233,641 B2 | 1/2016 | Sesti et al. |
| 9,277,104 B2 | 3/2016 | Sesti et al. |
| 9,565,342 B2 | 2/2017 | Sauer et al. |
| 9,609,757 B2 | 3/2017 | Steigerwald |
| 9,621,769 B2 | 4/2017 | Mai et al. |
| 10,128,595 B2 | 11/2018 | Conger et al. |
| 10,142,532 B2 | 11/2018 | Mleczko |
| 10,230,875 B2 | 3/2019 | Mleczko et al. |
| 10,250,004 B2 | 4/2019 | Conger et al. |
| 10,272,857 B2 | 4/2019 | Conger et al. |
| 10,484,587 B2 | 11/2019 | Conger |
| 10,926,714 B2 | 2/2021 | Byrne et al. |
| 2003/0185536 A1* | 10/2003 | Steinman ............. G02B 6/4452 385/134 |
| 2005/0001901 A1 | 1/2005 | Eggers et al. |
| 2006/0171704 A1 | 8/2006 | Bingle et al. |
| 2006/0189183 A1 | 8/2006 | Yang |
| 2006/0209523 A1* | 9/2006 | Cochrane ............. H05K 9/0073 361/818 |
| 2009/0115891 A1 | 5/2009 | Ryu et al. |
| 2009/0244361 A1 | 10/2009 | Gebauer et al. |
| 2011/0122267 A1* | 5/2011 | Ahn ..................... H04N 23/687 348/208.7 |
| 2011/0163904 A1* | 7/2011 | Alland .................... B60R 11/04 342/52 |
| 2011/0310248 A1 | 12/2011 | McElroy et al. |
| 2012/0218412 A1 | 8/2012 | Dellantoni et al. |
| 2013/0222595 A1 | 8/2013 | Gebauer et al. |
| 2013/0242099 A1 | 9/2013 | Sauer et al. |
| 2013/0328672 A1 | 12/2013 | Sesti et al. |
| 2013/0344736 A1 | 12/2013 | Latunski |
| 2014/0043525 A1* | 2/2014 | Azuma .................... G03B 3/10 348/357 |
| 2014/0138140 A1 | 5/2014 | Sigle |
| 2014/0218535 A1 | 8/2014 | Ihlenburg et al. |
| 2014/0320636 A1 | 10/2014 | Bally et al. |
| 2014/0340510 A1 | 11/2014 | Ihlenburg et al. |
| 2014/0362209 A1 | 12/2014 | Ziegenspeck et al. |
| 2014/0373345 A1 | 12/2014 | Steigerwald |
| 2015/0042807 A1 | 2/2015 | Ihlenburg et al. |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0243987 A1 | 8/2016 | Kendall |
| 2016/0268716 A1 | 9/2016 | Conger et al. |
| 2016/0286103 A1 | 9/2016 | Van Dan Elzen |
| 2017/0054881 A1 | 2/2017 | Conger et al. |
| 2017/0129419 A1 | 5/2017 | Conger et al. |
| 2017/0133811 A1 | 5/2017 | Conger et al. |
| 2017/0201661 A1* | 7/2017 | Conger ................ H01R 12/716 |
| 2017/0280034 A1 | 9/2017 | Hess et al. |
| 2017/0289457 A1* | 10/2017 | Hu ........................ H02K 33/02 |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2018/0098033 A1 | 4/2018 | Mleczko et al. |
| 2018/0352127 A1* | 12/2018 | Wang ..................... H04N 23/54 |

* cited by examiner

FIG. 11A
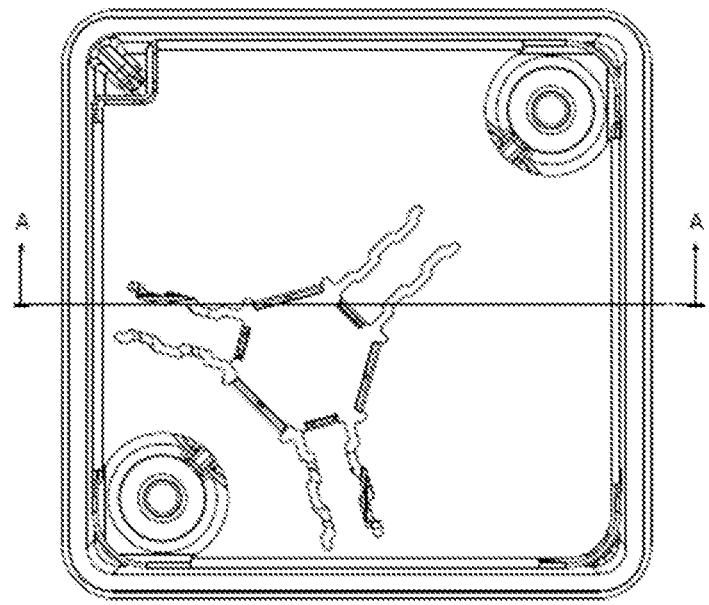
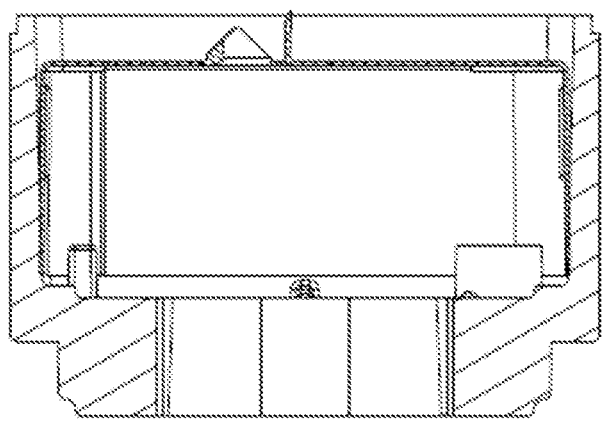
FIG. 11B

VEHICULAR CAMERA WITH ENHANCED EMI SHIELDING

CROSS REFERENCE TO RELATED APPLICATION

The present application claims the filing benefits of U.S. provisional application Ser. No. 63/262,980, filed Oct. 25, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras are known, such as described in U.S. Pat. Nos. 7,965,336 and/or 8,542,451, which are hereby incorporated herein by reference in their entireties.

SUMMARY OF THE INVENTION

Implementations herein include a vehicular camera assembly that includes a printed circuit board and a metallic shield element at least partially enclosing the printed circuit board. The assembly includes a housing at least partially enclosing the metallic shield element. The housing includes a front housing portion accommodating a lens. An imager is disposed at the printed circuit board and is optically aligned with the lens. The assembly includes an electrical connector for electrically connecting an electrical connecting element of the printed circuit board to a wire harness of a vehicle equipped with the vehicular camera assembly. The electrical connector protrudes through an aperture in the metallic shield element and the housing to electrically connect with the wire harness of the equipped vehicle. The metallic shield element includes at least one seam. Each respective seam of the at least one seam includes (i) a respective gap between opposing edge regions of the metallic shield element and (ii) a respective overlapping tab extending from one of the opposing edge regions that at least partially closes the respective seam. The housing and the metallic shield element are in contact.

These and other objects, advantages, purposes and features of the present invention will become apparent upon review of the following specification in conjunction with the drawings.

BRIEF DESCRIPTION OF THE DRAWINGS

FIGS. 10A-11B are cross-sectional views of the EMI shielding of FIG. 8;

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
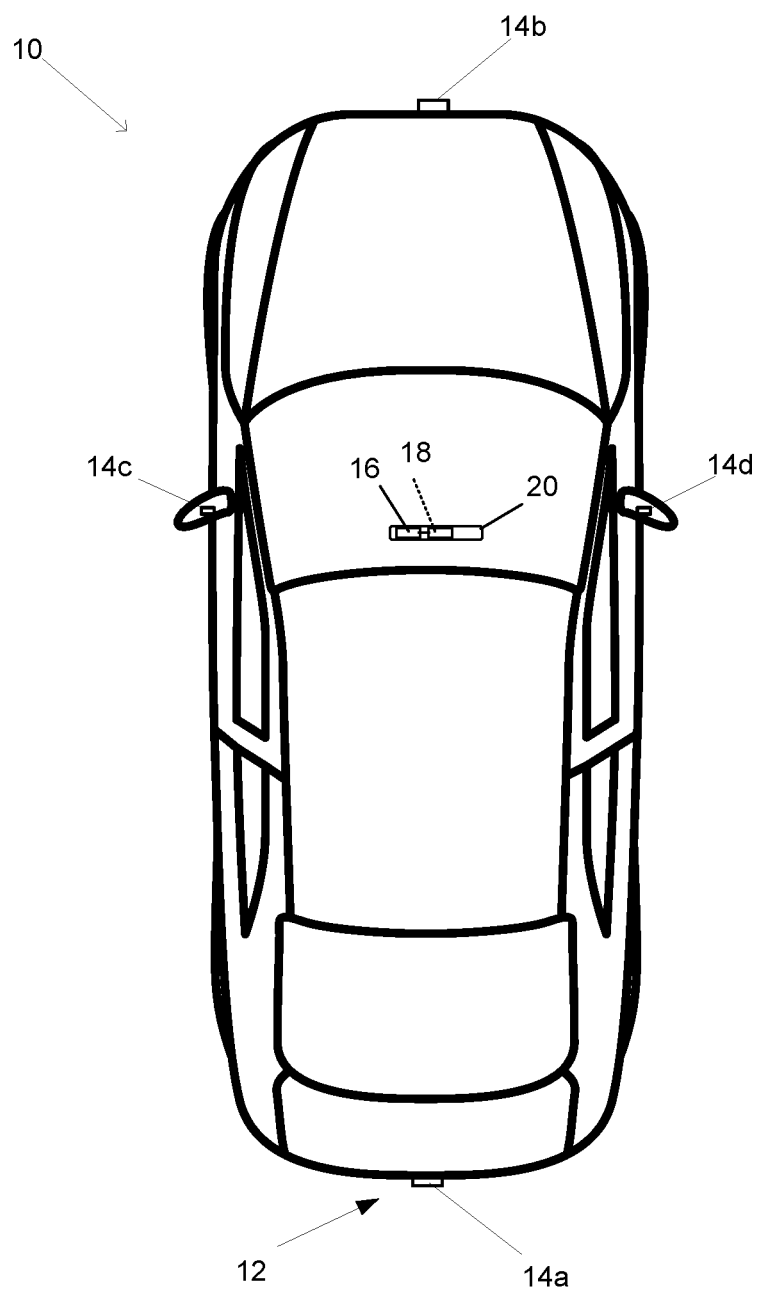
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2A:
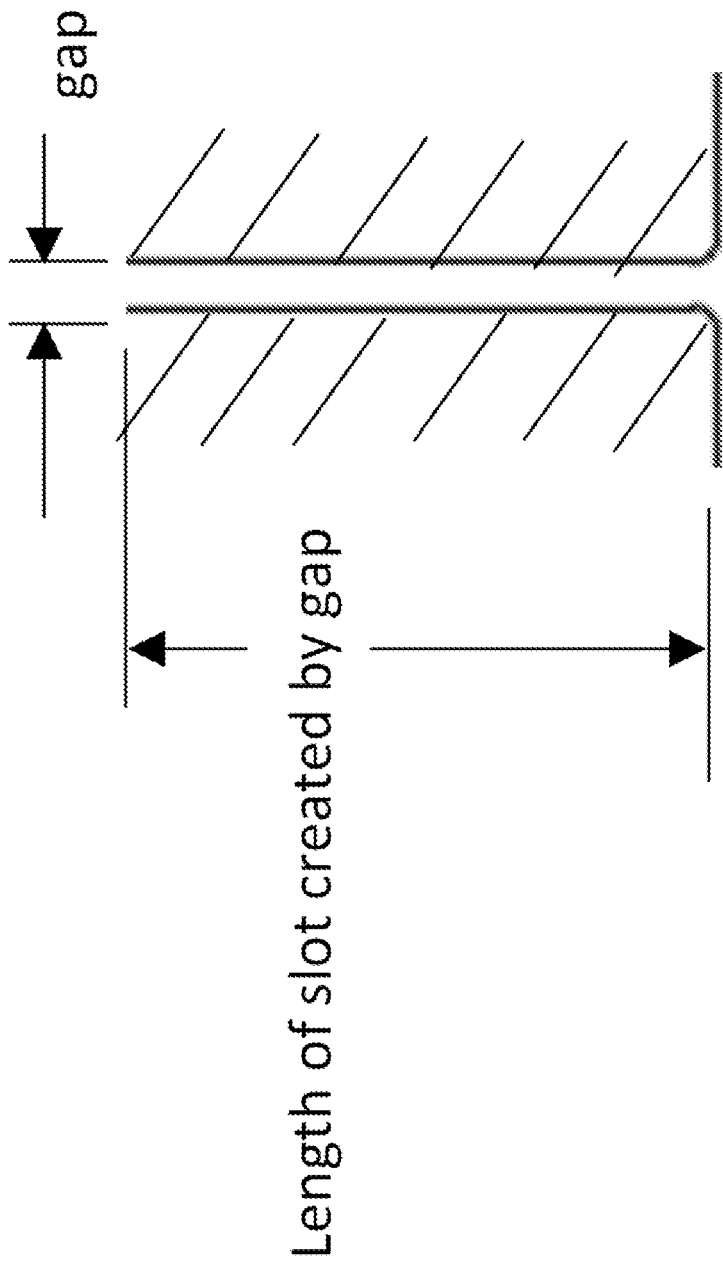
FIGS. 2A-2C are plan views of conventional techniques for minimizing gaps in electromagnetic interference (EMI) shielding.

Electromagnetic shielding is an important requirement of vehicular digital cameras. Cameras typically at least partially rely on shielding (e.g., metal plating) that at least partially surrounds the camera to protect from electromagnetic interference (EMI), such as a metal shield that at least partially surrounds or is at least partially surrounded by a camera housing. However, long gaps or seams in the walls of the shield allow for EMI to escape and/or enter the enclosure (FIG. 2A). These gaps are a result of the manufacturing process of the shield which is typically done by sheet metal stamping. In addition, these gaps allow for flexibility of the shield during assembly. Shield flexibility is important because the shield should press against the plastic housing for efficient thermal transfer between the housing and the external environment of the camera and because flexibility generally eases assembly.

Figure 2B:
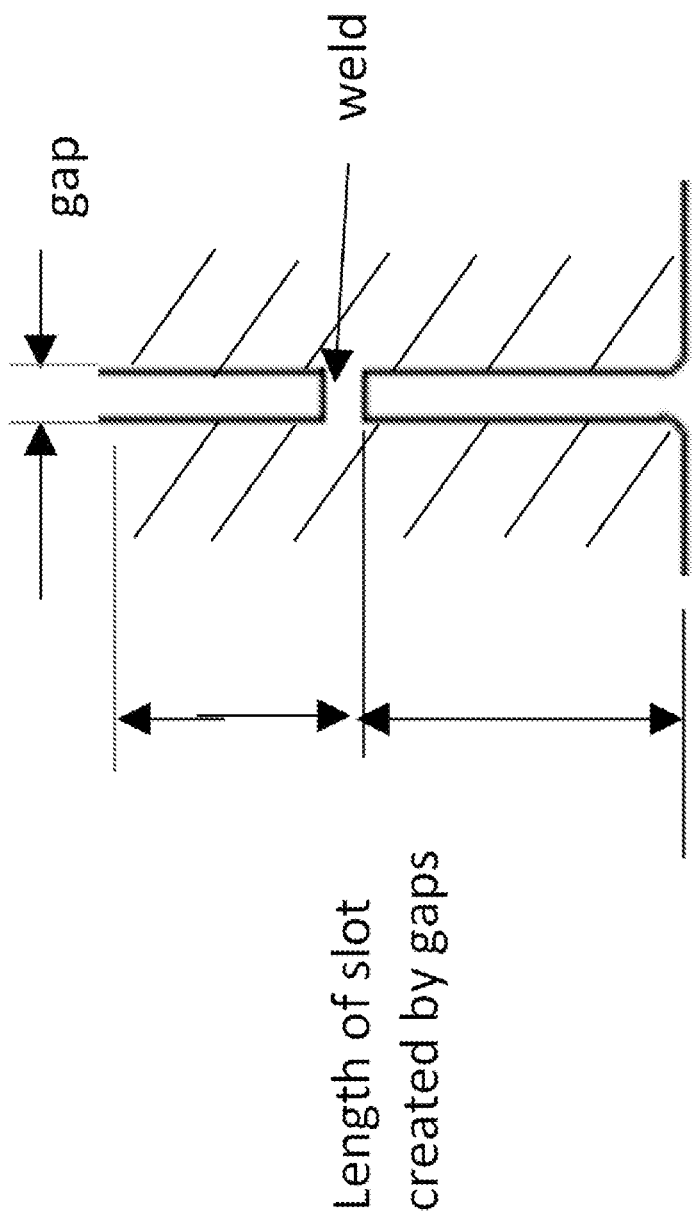
Figure 2C:
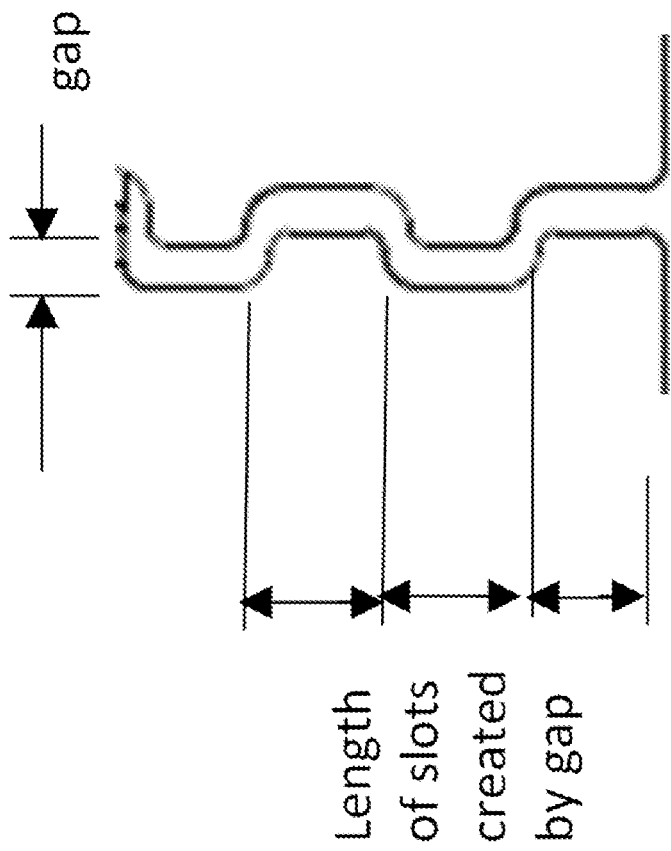

Referring now to FIGS. 2B and 2C, welding or crimping the gaps closed (FIG. 2B) will connect them electrically and therefore effectively shorten the length of the slot at every connection point, but this prevents flexibility for assembly and requires additional processing steps during manufacturing. Adding a stepped geometry to the gap (FIG. 2C), such as a zig-zag or elongated skew pattern (e.g., an isogonal elongated skew apeirogon pattern) interrupts the overall length of the gap (increasing effectiveness of the shield), but it is not as effective as a shield that has contact points across the gap or a shield that has a blocking wall.

Figure 3:
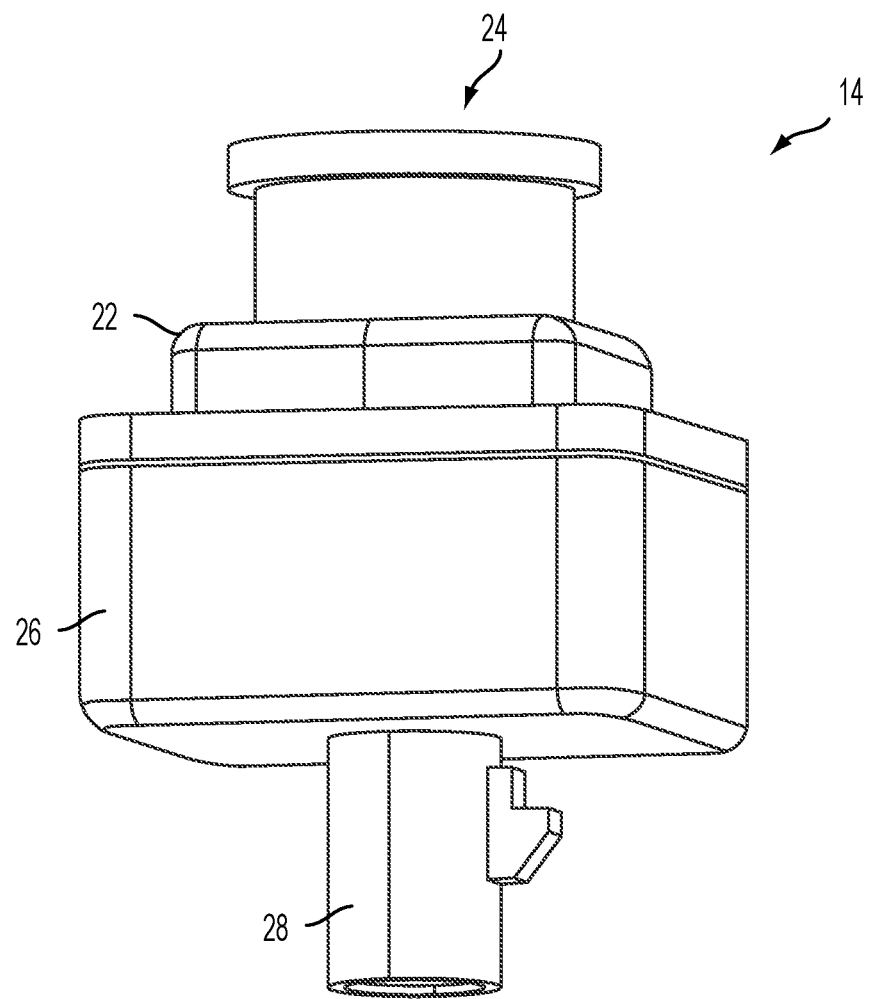
FIG. 3 is a perspective view of a vehicular camera.
Figure 4:
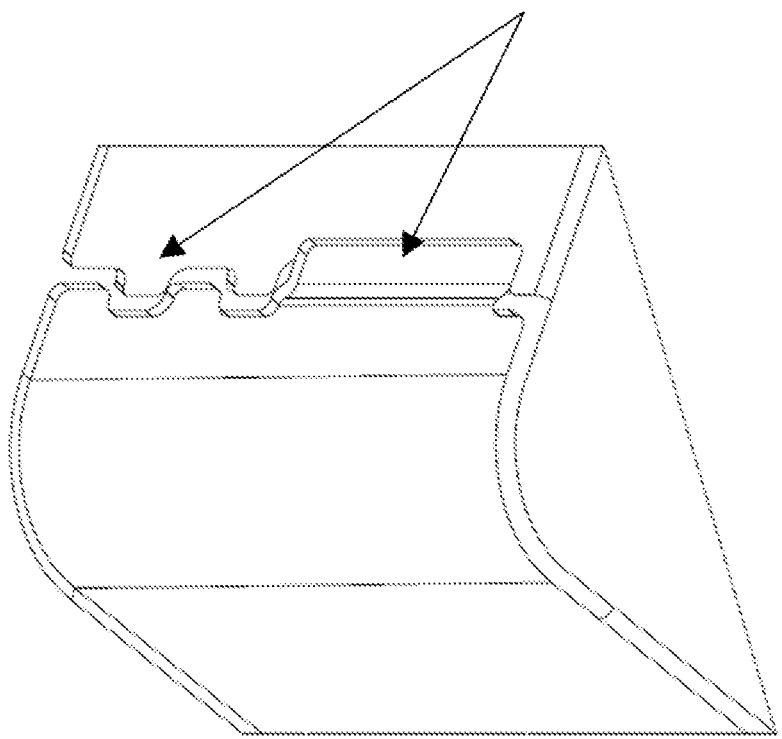
FIG. 4 is a perspective view of a portion of EMI shielding that includes one or more overlapping tabs to reduce a length of gaps in the EMI shielding.
Figure 5A:
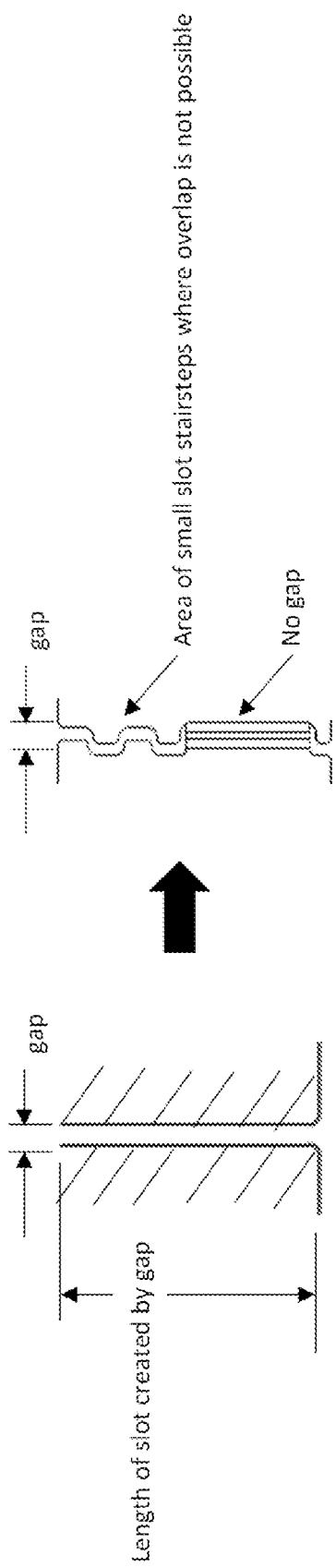
FIG. 5A is a comparison of a traditional gap and a gap with the overlapping tab of FIG. 4.

As shown in FIG. 3, the camera 14 of the vision system 12 includes a first or front housing portion 22 that includes a lens or lens assembly 24, and further includes a second or rear housing portion 26 that has a connector portion 28 for electrically connecting to or receiving one or more connecting ends of wires of the vehicle when the camera is disposed at the vehicle. Implementations herein include an EMI shield (i.e., shield element for reducing the effects of EMI on the camera) that includes areas of one or more overlapping tabs (FIG. 4) to allow for a flexible assembly state while simultaneously reducing the effective slot length (i.e., the length of the slot without interruption) and increasing shield effectiveness. The addition of the overlap tab(s) may reduce the length of any area that has the step feature (FIGS. 4 and 5A).

Figure 5B:
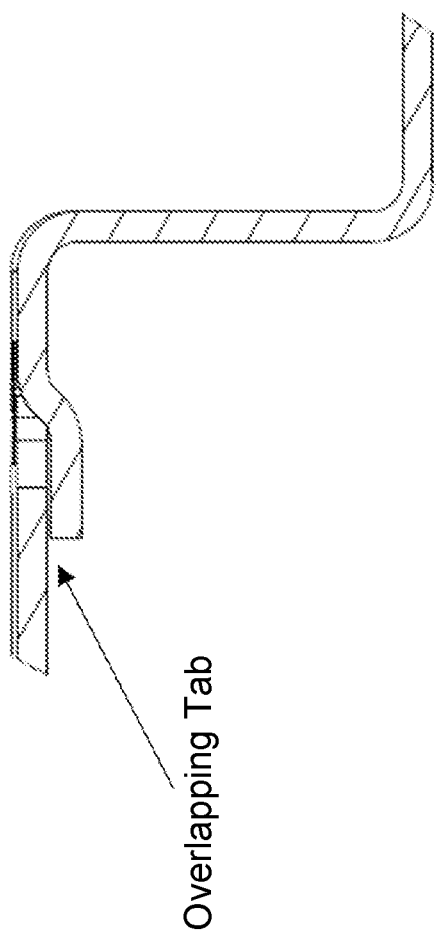
FIG. 5B is a plan view of the overlapping tab of FIG. 4.

As shown in FIG. 5B, the shield may compress perpendicular to each wall face during assembly to a housing of the camera (e.g., a plastic housing) when the size of the shield is larger than the inside of the plastic housing and the shielding at least partially surrounds the plastic housing. The gaps in the shield allow the walls to flex inward (and thus better transfer heat away from the camera). Long gaps reduce shielding effectiveness, but the overlapping tabs reduce the length of the slot created by the gap by blocking access for EMI to escape or enter. The overlapping tabs may also contact the adjacent wall once assembled into the housing to give the benefits of a welded housing (i.e., by reducing or eliminating gaps in the shield) while still allowing the flexibility to assemble.

Figure 7:
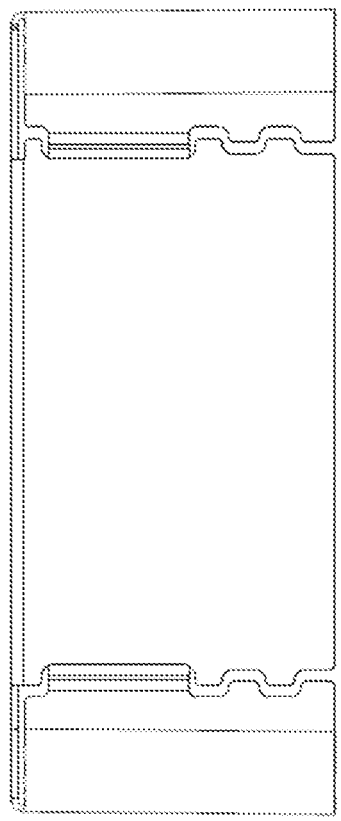
FIGS. 6 and 7 are additional exemplary plan views of the overlapping tabs of FIG. 4.
Figure 6:
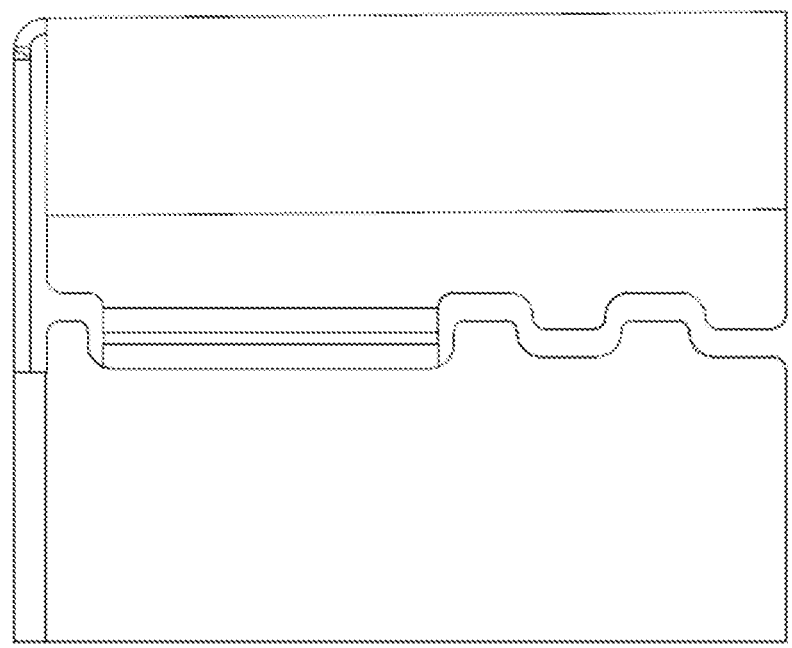
Figure 8:
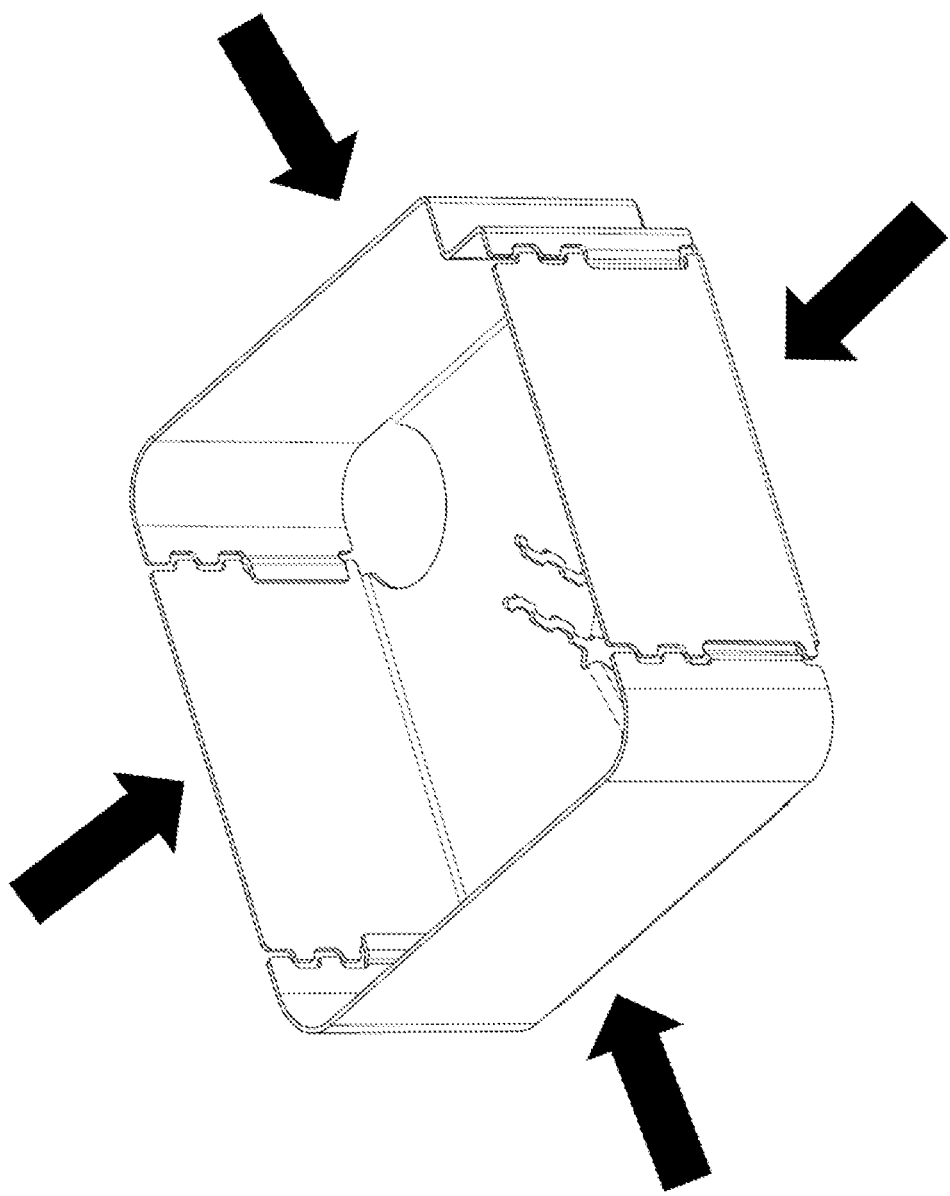
FIG. 8 is a perspective view of EMI shielding including a plurality of seams or gaps with one or more overlapping tabs.
Figure 9C:
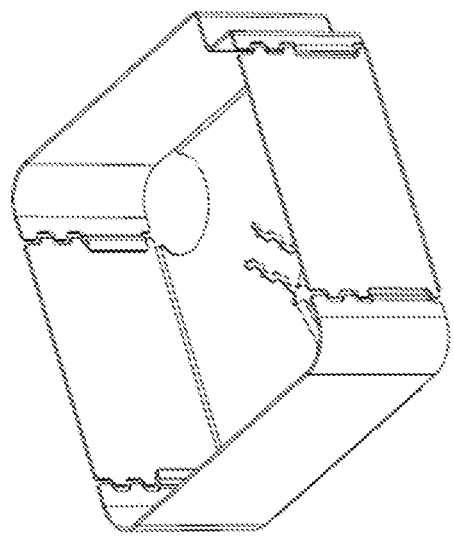
FIGS. 9A-9E provide additional exemplary views of the EMI shielding of FIG. 8.
Figure 9B:
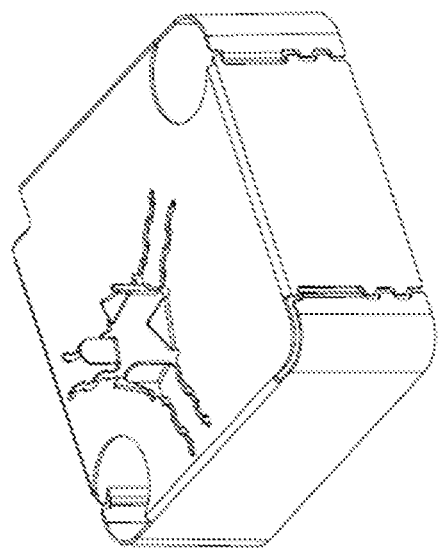
Figure 9A:
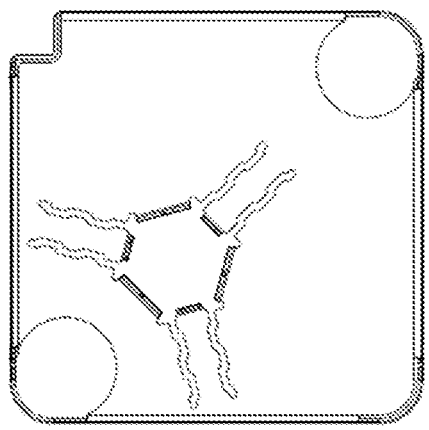
Figure 9E:
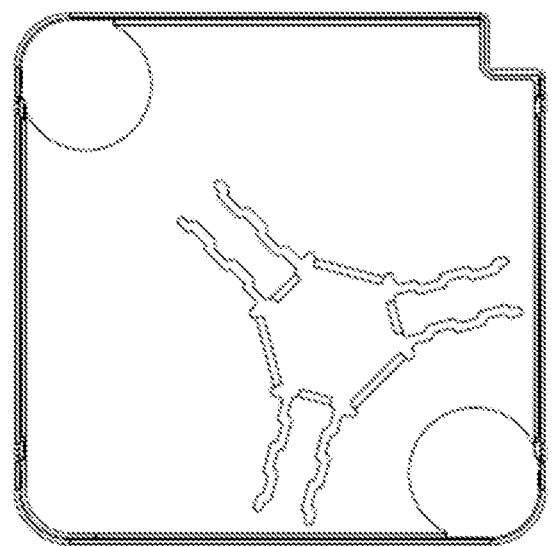
Figure 9D:
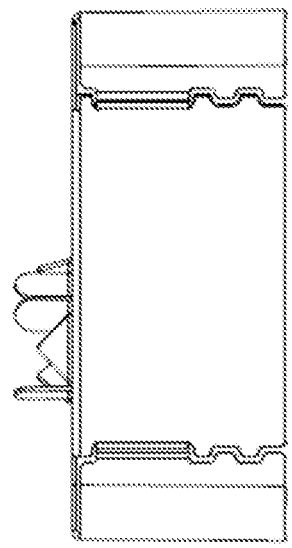

The overlapping tab may extend for any length of the "seam" (i.e., the gap) in the shielding. As shown in FIG. 6, the overlapping tab may be oriented along approximately half of the seam. That is, half of the seam includes the overlapping tab(s) and the other half includes small slot steps (e.g., where an overlap tab may or may not be possible). In some examples, the tab extends the length of the seam while in other examples the tab extends less than half the length of the seam. The tab may overlap or extend over the shield by any amount (e.g., at least one centimeter, at least five centimeters, etc.). A portion of the shield that the tab overlaps may be thinner (i.e., thinner than other portions of the shield that are not overlapped by the tab) in order to better accommodate the overlapping tab. The shielding may include any number of overlapping tabs. For example, one side of the shield may have zero, one, or two seams that include overlapping tabs (FIG. 7). As shown in FIG. 8, the shield may include a total of four seams, each seam with one or more overlapping tabs. Two of the seams may be on one side of the shielding while the remaining two seams may be on the opposite side of the shielding.

The seams allow the shield to be assembled together from multiple smaller pieces (e.g., four pieces). Optionally, the tabs help assemble and/or bond the pieces of the shield together after assembly. For example, friction or force provided by the tab contacting the shield at the overlapping portion may serve to at least partially fasten the pieces of the shield together. Optionally, the pieces of the shield may fastened or further fastened using any other means, such as welding, adhesive, etc. Each piece of the shield may be stamped from sheet metal or the like. FIGS. 9A-9E provide additional exemplary views of the shielding that includes multiple seams with overlapping tabs that reduce the length of seam/slot, thereby decreasing the amount of EMI that is passed through. The shield may include apertures or cutouts to allow, for example, cables, wires, wiring harnesses, etc., to pass through the shield. FIGS. 10A-11B provide exemplary cross-sectional views of the shielding or shield element.

Figure 12:
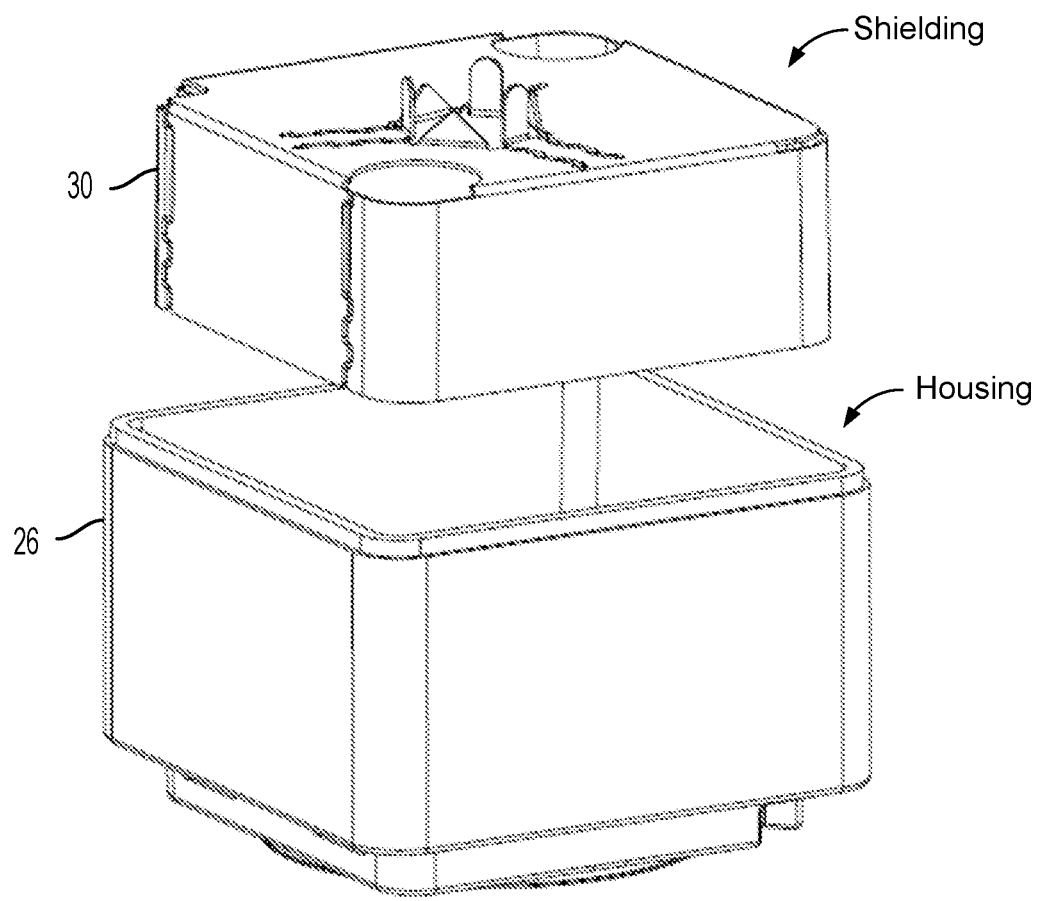
FIG. 12 is a perspective view of the EMI shielding of FIG. 8 and a housing that at least partially surrounds the EMI shielding.
Figure 13:
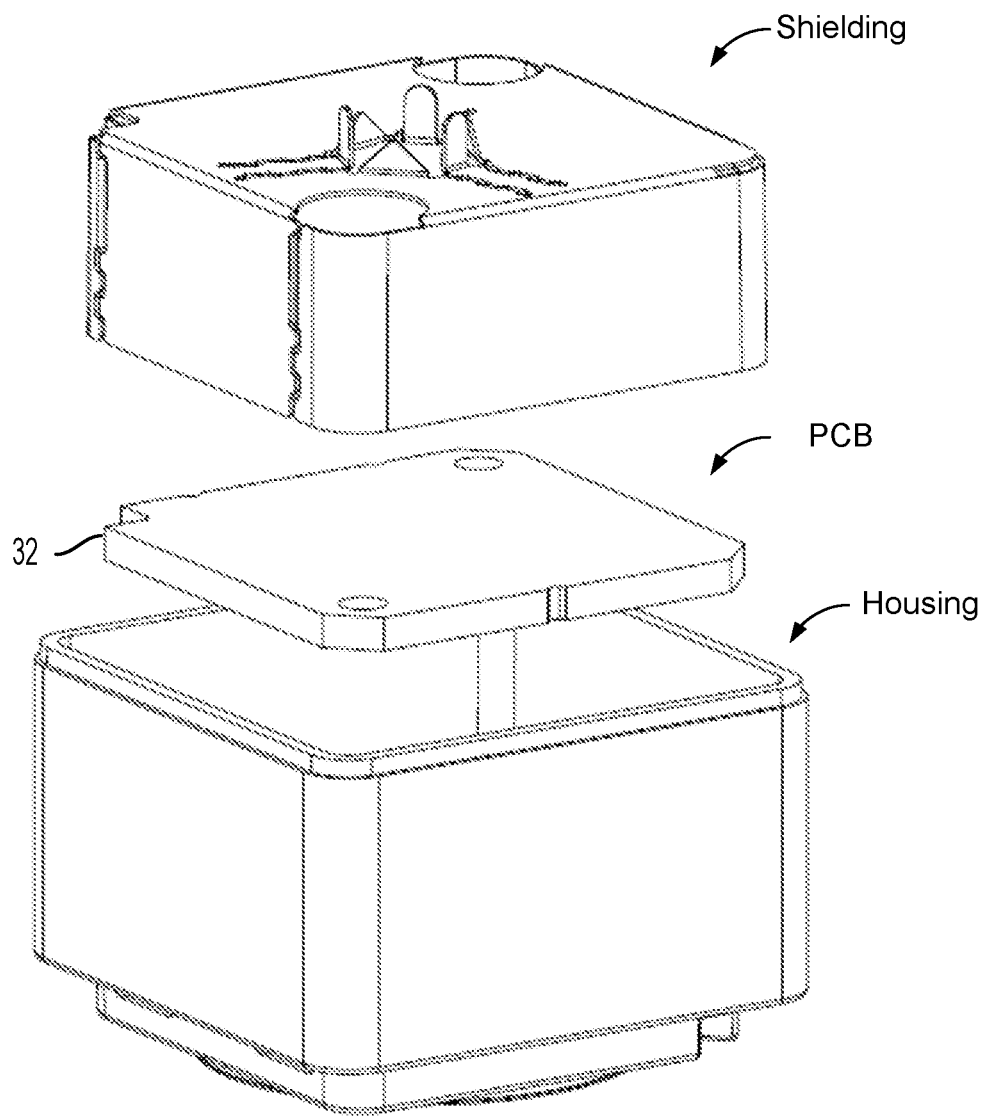
FIG. 13 is a perspective view of the EMI shielding of FIG. 8, a housing, and a printed circuit board (PCB).

As shown in FIG. 12, a shield element 30 may be at least partially encompassed by the camera housing (e.g., the rear camera housing 26), which may be made of a material such as plastic. In other examples, the shielding encompasses the housing. In yet other examples, the shielding and housing are integrated together. As shown in FIG. 13, a printed circuit board (PCB) 32 may be included within a cavity formed by the shielding and/or housing. In the illustrated embodiment, the shielding element includes an opening at the rear end of the element through which an electrical connector is disposed to provide electrical connection between circuitry of the PCB and a wire harness of a vehicle when the camera is installed at the vehicle. The shielding element may include tabs that engage and connect at the connector to ground the shielding element to a grounding portion of the connector.

Examples herein describe EMI shielding techniques for a vehicular camera, however it is understood that the EMI shielding techniques are applicable to any other sensors or processing systems that benefit from EMI shielding and from flexible installation processes (e.g., radar sensors, lidar, etc.). The EMI shield may include aspects described in U.S. Pat. Nos. 10,926,714; 10,484,587 and/or 10,128,595, which are hereby incorporated herein by reference in their entireties.

Figure 10A:
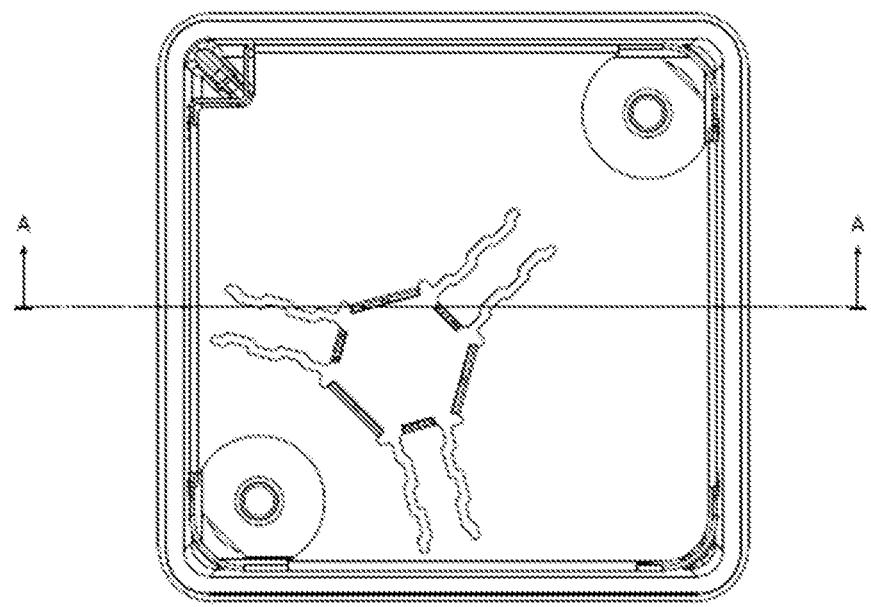
Figure 10B:
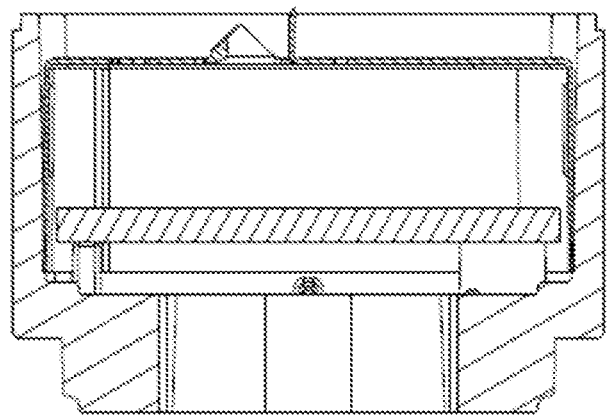

As shown in FIGS. 10B and 13, the camera may include a PCB disposed at or in the front or rear camera housing portion at a lens holder (that accommodates a lens). The PCB may comprise an imager printed circuit board with an imager disposed at a front side of the PCB and aligned with the lens. An electrical connection may extend from a rear side of the PCB for passing through the rear end or portion of the camera housing and EMI shield for electrical connection of circuitry of the PCB to a wire harness of a vehicle. Optionally, the camera may house or include the imager PCB at the front camera housing and a connector PCB that is disposed in the camera housing and is electrically connected to circuitry of the imager PCB (such as via a flexible ribbon cable or header connectors or the like), with the connector PCB having electrical connection that extends from a rear side of the connector PCB for passing through the rear end or portion of the camera housing and EMI shield for electrical connection of circuitry of the PCBs to a wire harness of a vehicle. The cameras and connectors may utilize aspects of the cameras described in described in U.S. Pat. Nos. 10,272,857; 10,250,004; 10,230,875; 10,142,532; 9,621,769; 9,277,104; 9,233,641; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0266430; US-2015-0365569; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306; US-2017-0302829; US-2018-0098033 and/or US-2018-0072239, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
   a printed circuit board;
   a metallic shield element at least partially enclosing the printed circuit board;
   a housing at least partially enclosing the metallic shield element, wherein the housing comprises a front housing portion accommodating a lens;
   wherein an imager is disposed at the printed circuit board, and wherein the imager is optically aligned with the lens;
   an electrical connector for electrically connecting an electrical connecting element of the printed circuit board to a wire harness of a vehicle equipped with the vehicular camera assembly, wherein the electrical connector protrudes through an aperture in the metallic shield element and the housing to electrically connect with the wire harness of the equipped vehicle;
   wherein the metallic shield element comprises at least one seam, each respective seam of the at least one seam comprising (i) a respective gap between opposing edge regions of the metallic shield element and (ii) a respective overlapping tab extending from one of the opposing edge regions that at least partially closes the respective seam;
   wherein the at least one seam partitions the metallic shield element into at least a first portion and a second portion, and wherein the first portion and the second portion comprise separate components, and wherein the respective overlapping tab of the first portion overlaps at least a portion of the second portion to at least partially secure the first portion relative to the second portion; and
   wherein the housing and the metallic shield element are in contact.

2. The vehicular camera assembly of claim 1, wherein each respective overlapping tab covers at least a portion of the respective gap.

3. The vehicular camera assembly of claim 1, wherein each respective overlapping tab is adjacent to the respective gap.

4. The vehicular camera assembly of claim 1, wherein the printed circuit board comprises a first side and a second side separated by a thickness of the printed circuit board, and wherein the imager is disposed at the first side of the printed circuit board, and wherein the electrical connecting element is disposed at the second side the of the printed circuit board.

5. The vehicular camera assembly of claim 1, comprising a connector printed circuit board, wherein the connector printed circuit board electrically connected to the electrical connecting element of the printed circuit board, and wherein a connecting end of the electrical connector is electrically connected to the connector printed circuit board.

6. The vehicular camera assembly of claim 1, wherein each respective overlapping tab reduces an effective slot length of the respective gap.

7. The vehicular camera assembly of claim 1, wherein the respective gap of the at least one seam comprises a step geometry to reduce an effective slot length of the respective gap.

8. The vehicular camera assembly of claim 1, where each respective overlapping tab contacts the housing, and wherein the contact facilitates heat transfer between the metallic shield element and the housing.

9. The vehicular camera assembly of claim 1, wherein the at least one seam comprises four seams.

10. The vehicular camera assembly of claim 9, wherein the four seams partition the metallic shield element into (i) the first portion, (ii) the second portion, (iii) a third portion and (iv) a fourth portion.

11. The vehicular camera assembly of claim 10, wherein each portion is formed via sheet metal stamping.

12. The vehicular camera assembly of claim 10, wherein a first seam of the four seams partitions the first portion and the second portion, and wherein the first portion comprises the respective overlapping tab, and wherein the respective overlapping tab of the first portion partially closes the first seam by overlapping at least the portion of the second portion.

13. The vehicular camera assembly of claim 10, wherein a second seam of the four seams partitions the second portion and the third portion, a third seam of the four seams partitions the third portion and the fourth portion, and a fourth seam of the four seams partitions the fourth portion and the first portion, and wherein (i) the second portion comprises a second overlapping tab that at least partially closes the second seam, (ii) the third portion comprises a third overlapping tab that at least partially closes the third seam and (iii) the fourth portion comprises a fourth overlapping tab that at least partially closes the fourth seam.

14. The vehicular camera assembly of claim 1, wherein the at least one seam increases flexibility of the metallic shield element.

15. A vehicular camera assembly, the vehicular camera assembly comprising:
 a printed circuit board;
 a metallic shield element at least partially enclosing the printed circuit board;
 a housing at least partially enclosing the metallic shield element, wherein the housing comprises a front housing portion accommodating a lens;
 wherein an imager is disposed at the printed circuit board, and wherein the imager is optically aligned with the lens;
 an electrical connector for electrically connecting an electrical connecting element of the printed circuit board to a wire harness of a vehicle equipped with the vehicular camera assembly, wherein the electrical connector protrudes through an aperture in the metallic shield element and the housing to electrically connect with the wire harness of the equipped vehicle;
 wherein the metallic shield element comprises at least one seam, each respective seam of the at least one seam comprising (i) a respective gap between opposing edge regions of the metallic shield element and (ii) a respective overlapping tab extending from one of the opposing edge regions that partially overlaps and closes the respective gap, and wherein at least a portion of the respective gap not overlapped by the respective overlapping tab comprises a step geometry to reduce an effective slot length of the respective gap;
 wherein the at least one seam partitions the metallic shield element into at least a first portion and a second portion, and wherein the first portion and the second portion comprise separate components, and wherein the respective overlapping tab of the first portion overlaps at least a portion of the second portion to at least partially secure the first portion relative to the second portion; and
 wherein the housing and the metallic shield element are in contact.

16. The vehicular camera assembly of claim 15, wherein the at least one seam comprises four seams.

17. The vehicular camera assembly of claim 16, wherein the four seams partition the metallic shield element into (i) the first portion, (ii) the second portion, (iii) a third portion and (iv) a fourth portion.

18. The vehicular camera assembly of claim 15, wherein the metallic shield element is formed via sheet metal stamping.

19. A vehicular camera assembly, the vehicular camera assembly comprising:
 a printed circuit board;
 a metallic shield element at least partially enclosing the printed circuit board;
 a housing at least partially enclosing the metallic shield element, wherein the housing comprises a front housing portion accommodating a lens;
 wherein an imager is disposed at the printed circuit board, and wherein the imager is optically aligned with the lens;
 an electrical connector for electrically connecting an electrical connecting element of the printed circuit board to a wire harness of a vehicle equipped with the vehicular camera assembly, wherein the electrical connector protrudes through an aperture in the metallic shield element and the housing to electrically connect with the wire harness of the equipped vehicle;
 wherein the metallic shield element comprises a plurality of portions, and wherein the plurality of portions are split by a plurality of seams, each respective seam of the plurality of seams comprising (i) a respective gap between opposing edge regions of the metallic shield element and (ii) a respective overlapping tab extending from one of the opposing edge regions that closes the respective seam;
 wherein the plurality of portions of the metallic shield element comprises separate components, and wherein each respective overlapping tab of the plurality of portions overlaps at least a portion of an adjacent portion of the plurality of portions of the metallic shield element to at least partially secure the plurality of portions of the metallic shield element; and
 wherein the housing and the metallic shield element are in contact.

20. The vehicular camera assembly of claim 19, where each respective overlapping tab contacts the housing, and wherein the contact facilitates heat transfer between the metallic shield element and the housing.

21. The vehicular camera assembly of claim 19, wherein the plurality of portions comprises four portions, and wherein the plurality of seams comprises four seams.

* * * * *